June 27, 1961
P. M. MINDER
2,990,511
ARRANGEMENT FOR INTERMITTENTLY INCREASING
KILOVAR OUTPUT OF CAPACITORS
Filed Nov. 10, 1955
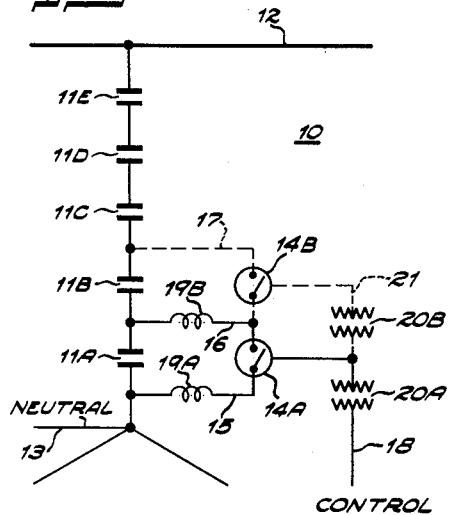
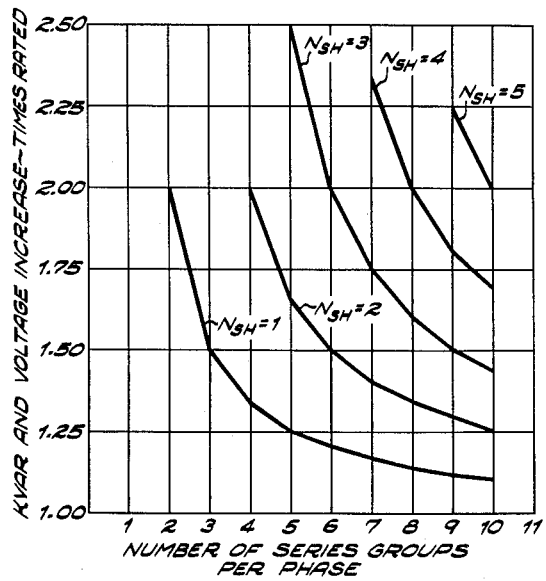
$N_{SH}$ = NUMBER OF SHORTED SERIES GROUPS PER PHASE
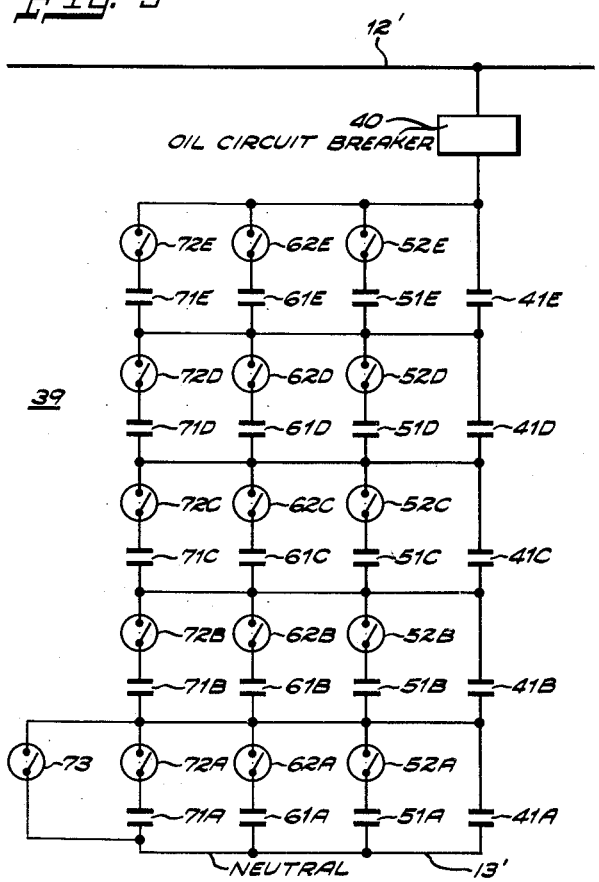
INVENTOR.
Peter M. Minder
BY Lee H. Kaiser
Attorney

United States Patent Office 2,990,511
Patented June 27, 1961

2,990,511
ARRANGEMENT FOR INTERMITTENTLY INCREASING KILOVAR OUTPUT OF CAPACITORS
Peter M. Minder, Basel, Switzerland, assignor to McGraw-Edison Company, a corporation of Delaware
Filed Nov. 10, 1955, Ser. No. 546,224
3 Claims. (Cl. 323—128)

This invention relates to electrical capacitors for supplying reactive power to alternating current power lines and more particularly to an arrangement for providing intermittent increased kilovar output of electrical capacitors connected in shunt to alternating current power systems.

Power capacitors have heretofore been used only to a very limited extent to supply the necessary kilovars in the event of a fault on an alternating current power system due to inherent characteristics of a static capacitor to automatically reduce its reactive volt ampere output at the very time when it is most needed, i.e., upon a drop in system voltage. Further, a power capacitor automatically increases its kilovar output at the very time when such output is a detriment to the system, i.e., upon an increase in system voltage. Traditionally synchronous condensers have been used instead of static capacitors for supplying reactive volt amperes to a fault even though the losses of synchronous condensers are many times higher than the losses of equivalent k.v.a. power capacitors and the cost of such synchronous condensers are greater than the cost of equivalent power capacitors. Notwithstanding the much greater operating and maintenance cost of the synchronous condenser and its occasional prolonged outage for repairs, the synchronous condenser is preferred to static capacitors largely because of its inherent ability to increase the leading kilovars furnished to the system upon the occurrence of a fault of sufficient severity to materially lower the system voltage. A normal synchronous condenser, if running at full load, will automatically increase its current output from 100 percent to approximately 150 percent upon a fifty percent reduction in system voltage from normal and will reduce its current output to substantially zero upon a thirty percent increase in system voltage above normal. On the other hand, the current output of a power capacitor will decrease fifty percent upon a fifty percent reduction in system voltage from normal and will increase thirty percent upon a thirty percent increase in system voltage above normal.

It is an object of the invention to provide an arrangement whereby static capacitors are satisfactorily employed for regulating system voltage, which capacitors are adapted to have their impressed voltage increased upon a decrease in system voltage from normal as a result of a system fault.

Operation of capacitors at overvoltage causes the capacitors to draw more current and results in increased kilovar output of the capacitor bank. Capacitors can safely withstand temporary overloads without damage, and this overload capacity of power capacitors can be utilized both for a short-time comparatively large kilovar increase for system stability in emergencies and for a longer time comparatively small kilovar increase for intermittent extreme voltage or power factor improvement.

It is a further object of the invention to provide an improved arrangement for temporarily increasing the kilovar output of a shunt capacitor bank even during low system voltage.

It is a still further object of the invention to provide a simple and inexpensive arrangement requiring a minimum of apparatus for switching capacitors so as to temporarily impress overvoltages on them and thus increase the capacitor bank capacity.

The invention is only applicable to multiseries capacitor banks wherein a plurality of groups of parallel connected capacitors are connected in series and such serial arrangement is connected in shunt to the power system. In accordance with the invention a short circuiting switch is connected in parallel with one or more, but not all, of the series groups of a multiseries group bank, and closure of the switch to short circuit one of the series groups impresses higher than normal voltage across the remaining series groups and increases the kilovar output of the entire bank.

Other objects and advantages of the invention will become apparent from the following description when taken in conjunction with the accompanying drawing wherein:

FIG. 1 is a circuit diagram of an arrangement in accordance with the invention for temporarily increasing the kilovar output of a capacitor bank, only a single phase being illustrated;

FIG. 2 is a curve relating the kilovar increase of the multiseries bank to the number of series group in each phase and the number of short-circuited series groups per phase; and FIG. 3 is a circuit diagram of an arrangement in accordance with the invention for temporarily increasing the kilovar output of a multi-step capacitor bank, only a single phase being illustrated.

The invention is applicable to both single phase and polyphase power systems. When utilized in a three phase system one or more of the series groups in all three phases, preferably the ones closest to the neutral, is short circuited to provide the desired increase in leading kilovars. Only one phase 10 of a multiseries, polyphase capacitor bank is illustrated in FIG. 1 and includes five groups of capacitors 11A, 11B, 11C, 11D and 11E connected in series between phase conductor 12 and the neutral 13. It will be appreciated that the symbol for each group 11 may represent either a single capacitor unit of a plurality of capacitor units in parallel and it is intended by the term "capacitor" in the description and appended claims to cover both a plurality of capacitor units in parallel as well as a single unit. The capacitors of each group can be designed for relatively low voltages and the groups of capacitors are connected in series to withstand the relatively high voltage between phase conductor 12 and neutral 13. It will also be appreciated that conductors 12 and 13 may be the lines of a single phase power system.

An electrical short-circuiting switch 14A is connected in shunt with the series group 11A closest to the neutral by conductors 15 and 16. Preferably the switch 14A is a capacitor switch having insulation of the 15 kilovolt class and adapted to be controlled from a remote location by an electrical signal over control line 18. To provide kilovar increase in emergencies the short-circuiting switch 14A should preferably close very rapidly after energization. Switch 14A does not constitute a part of the present invention, several suitable solenoid operated switches being commercially available, and to simplify the drawing and facilitate the understanding of the invention the details of the control wiring have been eliminated from the drawing and it is represented that the switch 14A is controlled by electrical control signals over conductor 18. The control solenoids of such switches are conventionally actuated by low voltage signals, and if the neutral of the capacitor bank is floating and the casing of the switch 14A is not grounded, the control signal should be supplied through an insulating transformer 20A preferably having a 1:1 ratio and insulation of the 15 kilovolt class to elevate the control signal to the level of the series group 11A being switched. In other words, the insulating transformer 20A is only required if there is a potential difference between switch 14A and ground. It will be appreciated that if the switch 14A is so designed to require a first signal to actuate the switch "On" (i.e., to closed position) and a second signal over a separate lead to actuate the switch "Off" (i.e., to open position) that two insulating transformers may be required. A current limiting reactor 19A may be connected in lead 15 to limit the capacitor discharge current when switch 14A is closed.

When it is desired to increase the kilovar output of the capacitor bank including phase 10, switch 14A is closed to short circuit the series group 11A closest to the neutral. Inasmuch as the total impedance of the serially connected groups 11E, 11D, 11C, 11B, and 11A is decreased by short circuiting one of the series groups 11A while the voltage betwen phase conductor 12 and neutral 13 remains constant, the current through the unshorted series groups 11E, 11D, 11C and 11B increases and consequently the total kilovar output of the bank is increased. The kilovar increase is effected only by the series groups 11E, 11D, 11C, and 11B which are energized at overvoltage. The short-circuited series group 11A does not contribute to the increased kilovar output of the capacitor bank. It will be apparent that control signals will be furnished to operate the short circuiting switches 14A of all of the phases substantially simultaneously.

If further increase of the kilovar output of the capacitor bank is desired, a capacitor short-circuiting switch 14B, similar to switch 14A, may be connected in parallel with series group 11B by conductor 17 shown in dotted lines, and it is schematically represented that switch 14B is electrically operated simultaneously with switch 14A by the same control signal applied to conductor 18 to operate switch 14A and transmitted to the control portion of switch 14B over conductor 21 shown in dotted lines. If a potential difference exists between the frames for mounting the series groups 11A and 11B, an insulating transformer 20B may be provided between the controls of the switches 14A and 14B. A current limiting reactor 19B may be provided to limit the current when switch 14B closes. Short circuiting switches 14A and 14B are closed substantially simultaneously by a control signal over lead 18 to short circuit series groups 11A and 11B respectively. The overvoltage on the unshorted series groups 11C, 11D, and 11E is apparently much greater than when only the one short circuiting switch 14A is operated, and the capacitors of groups 11C, 11D, and 11E are required to take more current and provide more leading kilovars to the system than when only a single series group 11A is short circuited.

FIG. 2 shows a graph of the kilovar increase of a multiseries capacitor bank as a function of the number of series groups 11 with the number of short-circuited series groups as a parameter. The ratio of the kilovar increase above rated kilovar of the bank is the same as the increase in voltage above rated voltage of the series groups which are not short circuited. For example, with five series groups 11A to 11E per phase, operation of switches 14A and 14B to short circuit groups 11A and 11B will increase the voltage across the remaining groups 11C, 11D, and 11E to 1.66 times rated voltage and also increase the kilovar output of the capacitor bank to 1.66 times the rated output of the bank. This overvoltage of 1.66 times rated voltage can be safely endured for approximately 1.5 minutes without damage to the capacitors. However, if only switch 14A is operated to short circuit series group 11A, the overvoltage on the capacitors of the remaining groups 11B, 11C, 11D, and 11E is only 1.25 times rated voltage, the kilovar output is 1.25 times the rated kilovar of the bank, and the increased output can be utilized safely for approximately three hours without damage to the capacitors.

The American Institute of Electrical Engineers has made recommendations for permissible 60 cycle over- voltage operation of power capacitors, some specific values being as follows:

1.8 times rated voltage for 15 seconds
1.7 times rated voltage for 1 minute
1.55 times rated voltage for 5 minutes
1.1 times rated voltage for 24 hours.

FIG. 3 shows only a single phase 39 of a multistep, multiseries, polyphase capacitor bank adapted to be connected in shunt between phase conductor 12' and neutral 13' of a polyphase alternating current power system in four equal steps. The first step of capacitors is switched at full phase to neutral voltage upon operation of oil circuit breaker 40 to connect the serial arrangement of series groups 41A, 41B, 41C, 41D and 41E in shunt to the power system between phase conductor 12' and neutral 13'. The capacitors of the remaining steps are switched at voltages which are only a fraction of phase to neutral potential in accordance with the invention disclosed in patent application Serial No. 402,296 to Strozier and having the same assignee as the subject invention by switching each series group in parallel with one of the groups 41A through 41E of the first step. Thus each series group 51A, 51B, 51C, 51D, and 51E of the second step is switched upon operation of its corresponding capacitor switch 52 in parallel with a series group 41 of the first step, e.g., series group 51C is switched in parallel with series group 41C upon operation of 52C, and the switches 52A, 52B, 52C, 52D, and 52E are operated substantially simultaneously to accomplish the switching of the second step of phase 29 of the capacitor bank to the power system. The capacitors of the series groups 61 and 71 of the third and fourth steps respectively of phase 39 are similarly switched upon operation of their corresponding switches 62 and 72 in parallel with a series group 41 of the first step. This method eliminates the necessity of an expensive oil circuit breaker for each step and permits the switching to be accomplished by inexpensive capacitor switches 52, 62, and 72 having insulation of the 15 kilovolt class. To simplify the drawing and facilitate the understanding of the operation of the apparatus, insulating transformers, control wiring for the switches, and possible inrush current limiting reactors have been omitted from the drawing; but it will be understood that in order to accomplish switching of each step of the capacitor bank after the first that control signals are supplied to the corresponding switches in all of the phases substantially simultaneously.

Considering the situation where four steps of capacitors shown in FIG. 3 have been installed in phase 39 of the capacitor bank as well as in the phases not illustrated, and it is under consideration to install a fifth step of capacitors. If this fifth step is not required for periods longer than three hours, an increase in kilovar output equivalent to that which would be furnished by the fifth step can be provided in accordance with the present invention, without the installation of further capacitors, simply by the installation of an inexpensive short-circuiting switch 73 in each phase. Operation of short-circuiting switch 73 short circuits the capacitors of all the series groups 41A, 51A, 61A, and 71A nearest the neutral, thereby increasing the voltage on the remaining unshorted series groups of the bank and increasing the kilovar output of the bank accordingly. It will be understood that the rated current of the total capacitor bank will not exceed the rated current of the short circuiting switch 73.

It will be appreciated that the invention comprises an extremely simple and inexpensive arrangement requiring only a few small 15 kilovolt switches and possibly some insulating transformers to reconnect capacitors of a multiseries capacitor bank to raise the kilovar output of shunt capacitors even during low system voltage. While only a few embodiments of the invention have been illustrated and described, it will be obvious to those skilled in the art that various changes and modifications can be made therein without departing from the invention, and it is intended in the appended claims to cover all such changes and modifications which fall within the true spirit and scope of the invention.

What I claim as new and desire to secure by Letters Patent of the United States is:

1. In a polyphase alternating current electrical power system, in combination, a capacitor bank for supplying reactive volt amperes to said power system including a plurality of power factor correcting capacitors in each phase of said system, the capacitors of each phase being arranged in groups of parallel connected capacitors and said groups being connected in series, means in each phase for connecting the serial arrangement of said groups in shunt to said system, a normally open electrical switch in each phase connected in parallel with one of said groups of the corresponding phase and adapted upon closure thereof to short circuit said one of said groups, and means to actuate the switches of all of the phases to closed position substantially simultaneously, whereby the voltage across the unshorted groups will be raised and the kilovar output of said bank will be increased.

2. In an alternating current electrical power system, in combination, a plurality of serially connected groups of paralleled power factor correcting capacitors, means for connecting said serially connected groups in shunt to said power system, whereby said capacitors supply reactive volt amperes to said system, a plurality of normally open short circuiting switches each adapted to be actuated to closed position upon receipt of an electrical control signal, certain ones of said groups having one of said short circuiting switches connected in parallel therewith, and means including an insulating transformer for supplying an electrical control signal to all of said switches substantially simultaneously, whereby operation of said switches to closed position raises the voltage across the unshorted groups and increases the reactive volt amperes supplied to said power system.

3. In combination with a polyphase alternating current electrical power system, a capacitor bank having power factor correcting capacitors adapted to be connected to each of the phase conductors of said polyphase power system and in shunt to said system to supply reactive volt amperes to said system, said capacitors being arranged in serially connected groups of paralleled capacitors, an individual electrical switch associated with each said arrangement of serially connected groups and being connected in shunt with one of said groups and adapted upon the receipt of a first electrical control signal to close and short circuit said one of said groups and upon the receipt of a second electrical control signal to open and remove the short circuit, and means to supply electrical control signals to the switches associated with all of said arrangements of serially connected groups substantially simultaneously, whereby closure of said switches raises the voltage across the unshorted groups and increases the reactive volt amperes supplied to said system.

References Cited in the file of this patent

UNITED STATES PATENTS

| 2,249,877 | Woods | July 22, 1941 |
| 2,428,576 | Marbury | Oct. 7, 1947 |
| 2,443,117 | Pittman et al. | June 8, 1948 |
| 2,722,656 | Marbury | Nov. 1, 1955 |
| 2,802,171 | Minder | Aug. 6, 1957 |

FOREIGN PATENTS

| 469,346 | Great Britain | July 23, 1937 |